Jan. 16, 1968   W. PAUL ETAL   3,364,451
SWITCHING DEVICE WITHOUT SPRING CONTACTS
Filed June 29, 1965
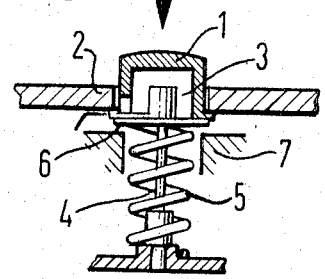
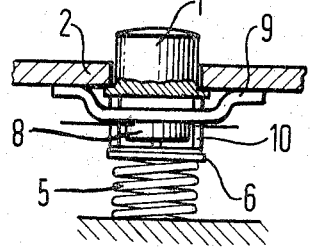
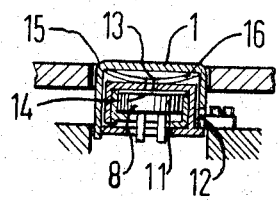
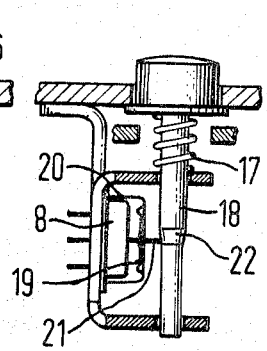
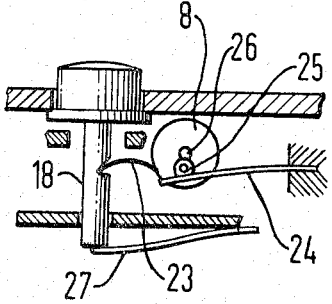
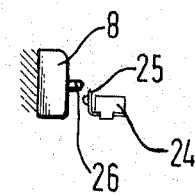
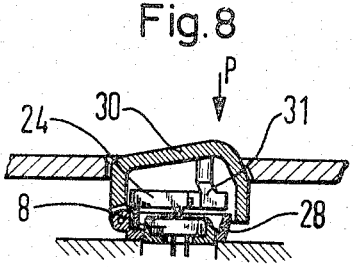

3,364,451
SWITCHING DEVICE WITHOUT SPRING CONTACTS
Walter Paul, Adolf Adam, and Max Bremberger, Munich, Germany, assignors to Siemens Aktiengesellschaft, Munich, Germany
Filed June 29, 1965, Ser. No. 467,945
Claims priority, application Germany, July 13, 1964, S 92,020
3 Claims. (Cl. 338—47)

ABSTRACT OF THE DISCLOSURE

A switching device for production of electrical switching processes wherein a force storage element is positioned between an actuator element and a semi-conductor device so that upon movement of the actuator a force is transmitted to the semi-conductor device to change its electrical characteristics. The force communicated by the force storage element is limited to a predetermined maximum to prevent overload of the semiconductor device.

---

This invention concerns a switching device not employing spring contacts, for the manual production of electrical switching processes such as used for long distance communication installations, and in particular for push button switches for keyboards in telephone subscriber installations.

The purpose of the invention is to construct such a switching device in a way so that it is operable like an ordinary push button-controlled spring contact switch and still takes up the least possible room in the operating direction.

In known electrical controls for elevators, machine tools and the like, contact-less switching devices in the form of "touch condensers" are utilized, which, upon being touched by hand or upon the approach of a human hand, change electrical characteristics of a circuit containing the control devices and thereby start switching processes.

It has already been suggested that touch condensers of this kind be employed for the manual production of electrical switching operations in telephone installations.

According to another suggestion, instead of push buttons operating on spring contacts, photoelectric light beams are utilized for keyboards, these light beams being interrupted by hand motion in order to produce the desired switching function.

While these suggested switching devices are quite advantageous in themselves, their application is hindered by the fact that they react differently from the usual, ordinary, push buttons, which yield to the pressure of a finger and keep moving to a limit stop.

It has also been suggested to utilize switching devices which operate in push button manner but, instead of operating on the usual spring contacts, directly press one switching wire into contact with another. This construction, however, requires a correspondingly special guidance device and special construction of the wiring in the circuit to be controlled.

In order to provide a switching device not employing spring contacts and wherein the connection wires can be connected in the same manner as the usual pushbuttons operating on spring contacts and also wherein the element actuated by the operator acts the same as an ordinary pushbutton head, pivoting lever, or rotary toggle, electrical components are utilized whose electrical characteristics are changed by changes in pressure mechanically exerted thereon. Such components in the form of piezoelectric electric resistors are currently employed in electro-acoustical transformers and electro-magnetic relays. These semiconductors, while reacting to mechanical loads, are very sensitive to overload, which is particularly likely in the case of manual actuation.

According to the invention, the difficulties arising both from the actuation characteristics of previously suggested switching devices without spring contacts and also the use of semi-conductors, are overcome when semi-conductors are controlled by indirectly-exerted forces. This is achieved by use of an operating element of a known kind, movable by hand to control a force storage element, which element exerts a mechanical force of a certain magnitude on the semi-conductor to cause a change in the electrical characteristics thereof. A switching device constructed in such manner has the advantage that it operates exactly as the ordinarily used switching devices with push-button head, pivoting lever or rotary toggle, and nevertheless does not have spring contacts, so that the transition from the known devices to switching devices without spring contacts represents no difference in actuation to the operator. These semi-conductors can be constructed in such small sizes that the space requirement for the entire switching device is only slightly greater than the space required for the movable actuation element. Therefore, such a switching device is especially suitable for keyboards in telephone subscriber installations, for example, for dial keyboards. The sensitivity of this kind of semi-conductors to mechanical overloading is dealt with in the simplest manner by inter-connection of the mentioned force storage element to the semi-conductor. In the case of such switching devices, special systems for mutual electrical screening, such as are necessary in touch condenser systems, can also be omitted.

In one embodiment of the invention, a piezoelectric resistor is utilized as the semi-conductor which, in rest position of the switching device, is stressed by force from the force storage element. Thereby the necessary stroke of the actuation element can be maintained so small that membrane-like actuation elements also can be utilized.

In another embodiment, a planar transistor is utilized as the semi-conductor which is stressed by force from the storage force element. Such semi-conductors are more robust than piezoelectric resistors and do not exhibit unequal expansion characteristics so that they are easily adapted to particular space conditions.

In a third form of the invention, the actuation element acts on the semi-conductor by a force storage element formed as a flexible intermediate member, there being an actuation element between the force storage element and the actuation element. These elements are developed and arranged in such a way that only one component of the operating force, adjustable within a certain minimum and a certain maximum, is transmitted to the semi-conductor. The force effective upon the semi-conductor is dependent in larger measure on the starting and end position of the actuation element than in the case of the previously mentioned developments, which provides for accurate operation.

Since the semi-conductors react to the slightest fluctuations of the tensile or compressive force thereon, inadvertent or half-actuation of the actuation element may release electrical switching processes. In order to avoid this possibility, a further form of the invention has the force storage element in the form of a snap spring which is movable into its operating position by the actuation element and which controls a switching arm acting on the semi-conductor. Through this construction, control of the semi-conductor is achieved only from a certain actuation path, from which the control operation occurs suddenly, but without posing extra demands on the semi-conductor. Whether the actuation leads to a permanent or a temporary operation of the semi-conductor thereby is only a matter of setting of the elements of the switch.

The invention will now be described in more detail in conjunction with various embodiments thereof, shown in the accompanying drawings.

In the drawings:

FIG. 1 is a view partially in section of one embodiment of the switching device of the invention;

FIG. 2 is a similar view of a second embodiment of the switching device of the invention;

FIG. 3 is a sectional view, taken along line A—A of FIG. 4;

FIG. 4 is a plan view of a third embodiment of the invention;

FIG. 5 is a view partially in section of a further embodiment of the switching device;

FIG. 6 is a view partially in section of an additional modified form of the invention;

FIG. 7 is a general elevational view taken at right angles to FIG. 6, showing the semi-conductor and actuating element thereof;

FIG. 8 is a sectional view of another modification of the invention; and

FIG. 9 is a further sectional view taken at right angles to the view of FIG. 8.

The switching device shown in FIG. 1 has an actuating element 1 which is formed in a cap shape and acts as a pushbutton, movable by hand, which is guided within a plate 2 serving a limit stop, and is located within the range of movement of member 1. An end member 3 forms the free end of a fixedly arranged rod-shaped semi-conductor 4, and is pressed upwardly by a force storage element 5, formed as a spiral spring, which acts upon a disc 6. In rest position of the actuation element 1, force storage element 5 stresses semi-conductor 4. A piezoelectric resistor is utilized as semi-conductor 4, which is connected electrically to a circuit not here shown.

Upon pushing down an actuation element 1, which presses on disc 6 until a stop element 7 is contacted by disc 6, the force of force storage element 5 is overcome, and thereby change in a manner effective in the mentioned circuit.

In accordance with the electrical reaction sensitivity of the circuits, just a small decrease in the tensile force is sufficient to produce the desired electrical switching process, so that instead of the shown, cap-shaped actuation element 1, a membrane requiring only a short actuation stroke can be installed. A bending stress on the semi-conductor or an over-strain in the direction of the force, or opposite thereto, cannot occur.

FIG. 2 shows a construction of the switching device wherein a planar-transistor 8 responsive to pressure is utilized as the semi-conductor. The actuating element (formed as a solid push-button) has a lower lip which is pressed upwardly against the plate 2 by a spring force storage element 5 which bears against a disc 6. At the same time, the force storage element 5 exerts a continuous pressure on the semi-conductor 8 which is attached to a cross-bar 9, this pressure being limited by the rest position of plate 6, set by the stops 10 extending therefrom to the actuation element 1. The pressure of force storage element 5 on semi-conductor 8 can be accurately set by bending the crossbar 9. The planar-transistor 8 is more robust than the semi-conductor 4 and has almost equal expansion characteristics in all three coordinate directions, and for this reason it is especially suited for switching devices which must be as small as possible and with which keyboards are to be constructed for use in an apparatus (for example, telephone subscriber apparatus) of normal measurements.

A construction especially suited to such application is shown in FIGS. 3 and 4. In that embodiment, a semi-conductor 8 is arranged in a carrier 11 which is threaded into a casing 12 and is therefore movable in the force direction. Actuation element 1 overlaps casing 12 in cap-like fashion and covers a slightly dished flat spring 13 serving as the force storage element. Force storage element 13 has its vertex pressing against a pin 14 (preferably a sapphire pin) fixed to semi-conductor 8, with a force determined by the setting of carrier 11 in casing 12. The casing has an upward-extending annular lip 15 which acts as a stop for the force storage element 13. The upper end of the force storage element is in contact with actuation element 1. Upon application of pressure to actuation element 1, the upper end 16 of the force storage element 13 is bent downwardly, so that its vertex is lifted in the opposite direction, thereby reducing the pressure on semi-conductor 8. The force storage element 13, like corresponding element 5 (FIG. 1 or 2) at the same time acts as a return spring for the actuation element 1. The arrangements of FIGS. 3 and 4 is distinguished by its very small space requirements.

A fourth construction of the switching device is shown in FIG. 5, wherein a return spring 17 for a shaft-like actuation element 18 does not directly act on semi-conductor 8, but does so over a force storage element 19 formed as a flexible intermediate member.

Force storage element 19 is of the form of a flexible bridge and is located in a casing 20, which receives the semi-conductor 8, whose position preferably is adjustable. In its rest position force storage element 19 exerts a certain pressure on the semi-conductor 8 through a pin 21 which is attached thereto. The pin 21 extends outwardly from the casing 20 perpendicularly to the actuation direction of actuation element 18 and into the path of an actuation element 22, which is formed by a conical shoulder on the shaft of actuation element 18. In this arrangement, return spring 17 acts only with one component of its force on the force storage element 19, and such component is accurately adjustable to form minimum and maximum values determined by the position and construction of the actuation element 22.

A further embodiment of the switching device is shown in FIGS. 6 and 7. This embodiment is intended to prevent operation of the switching device by an inadvertent, incomplete actuation of actuation element 18. For this purpose a force storage element 23, formed as a snap spring, is suspended by a resilient switching arm 24. Switching arm 24 carries an actuation member 25 into the path of which protrudes a pin 26 attached to semi-conductor 8. At the other end the force storage element 23 extends into a triangular slot in actuation element 18, which is under the control of a leaf spring 27 operating as a return spring. Upon application of pressure on the push-button of actuation element 18, when a certain position of that actuation element is reached, the switching arm 24 will suddenly be reversed and thereby cause its actuation member 25 to exert a pressure on semi-conductor 8. Whether a lasting control of the semi-conductor 8 or a temporary one occurs during the movement of the actuation member 25 depends only on the relative setting of the parts.

FIGS. 8 and 9 show a suitable construction of the above-described switching devices when only very small space is available therefor. In such construction, a casing 28 is provided to receive semi-conductor 8 and at the same time serve to contain resilient carrying arm 29 for the snap-spring-like force storage element 23 and for switching arm 24. An actuation element 30 is also pivoted to the casing and is movable in tipping lever fashion. The element 30 has the form of a cap covering casing 28. In actuation element 30 is provided a head 31 in the form of a wedge-shaped area, which, upon actuation thereof by pressure on element 30 exerts pressure on arm 29 and thereby causes the force storage element 23 to cause switching arm 24 to exert pressure on semi-conductor 8.

While several embodiments of the invention have been described, it will be evident that many other modifications are possible. Accordingly, the invention is not to be considered limited to the embodiments actually shown herein, but rather only by the scope of the appended claims.

We claim:
1. A switching device without spring contacts for the manual production of electrical switching processes including:
- a hand-operable actuating element (30);
- a semi-conductor element (8) whose electrical characteristics change with change in the force exerted thereon;
- a switchnig arm (24) positioned adjacent the semiconductor element and movable into contact therewith;
- a snap acting spring (23) connected at one end to the switching arm for normally restraining the switching arm from exerting a force on the semi-conductor element;
- a resilient arm (29) connected to the other end of the snap spring, said arm being movable by the operation of the actuating element to shift the snap acting spring so that the snap spring urges the switching arm into contact with the semi-conductor element and wherein the force which the switching arm exerts on the semi-conductor does not exceed a predetermined maximum force.

2. The apparatus of claim 1 which further includes:
a casing (28) for mounting said semi-conductor, and wherein said actuator element includes a cap pivotally mounted to the casing and extending thereover, and a wedge shaped member (31) extending downwardly therefrom so that upon pivoting the cap the wedge shaped member moves the resilient arm.

3. The apparatus of claim 2 wherein said switching arm (24) and the resilient arm (29) are supported in the casing at their ends which are removed from the snap spring.

References Cited
UNITED STATES PATENTS

| | | | |
|---|---|---|---|
| 2,536,012 | 12/1950 | Turner | 338—108 |
| 2,558,563 | 6/1951 | Janssen | 338—2 |
| 2,632,062 | 3/1953 | Montgomery | 338—2 |
| 2,944,204 | 7/1960 | Herbert | 310—8.7 |
| 2,951,817 | 9/1960 | Myers | 338—47 |
| 3,076,903 | 2/1963 | Schwartz | 310—8.3 |
| 3,239,696 | 3/1966 | Burkhalter et al. | 310—8.3 |
| 3,250,965 | 5/1966 | Rinder | 338—2 |
| 3,274,828 | 9/1966 | Pulvari | 73—141 |

RICHARD M. WOOD, *Primary Examiner.*

W. D. BROOKS, *Assistant Examiner.*